(12) United States Patent
Dickson

(10) Patent No.: US 6,322,226 B1
(45) Date of Patent: Nov. 27, 2001

(54) ADJUSTABLE ILLUMINATION APPARATUS HAVING PRE-FOCUSED LED AND MAGNIFICATION LENS

(76) Inventor: Daniel Dickson, 442 Paulina Ave., Redondo Beach, CA (US) 90277

( * ) Notice: Subject to any disclaimer, the term of this patent is extended or adjusted under 35 U.S.C. 154(b) by 0 days.

(21) Appl. No.: 09/489,854

(22) Filed: Jan. 24, 2000

(51) Int. Cl.⁷ .................................................. G02B 27/02
(52) U.S. Cl. .............................. 362/33; 362/234; 362/98; 362/253; 359/802
(58) Field of Search ..................................... 362/244, 245, 362/138, 139, 249, 240, 234, 98–99, 33, 253; 359/798, 802–811, 817

(56) References Cited

U.S. PATENT DOCUMENTS

| 1,909,662 | 5/1933 | Conners . |
| 3,600,064 | 8/1971 | Walz . |
| 3,945,717 | 3/1976 | Ryder et al. . |
| 4,696,546 | 9/1987 | Hodges . |
| 4,744,019 | * 5/1988 | Krogsrud ............................. 362/402 |
| 5,021,933 | 6/1991 | Cordes . |
| 5,486,986 | 1/1996 | Brada . |
| 5,580,163 | 12/1996 | Johnson, II . |
| 5,625,498 | 4/1997 | Wu et al. . |
| 5,879,075 | * 3/1999 | Conner et al. ........................ 362/551 |

FOREIGN PATENT DOCUMENTS 416638   9/1934   (GB) .

* cited by examiner

Primary Examiner—Stephen Husar
Assistant Examiner—Anabel Ton
(74) Attorney, Agent, or Firm—Chan Law Group LC

(57) ABSTRACT

An illumination apparatus that has a magnification means in combination with LED's (Light Emitting Diodes). The LED's are arranged in an array inside a lens hood that surrounds the magnification means and are mounted at an angle to provide optimum lighting onto the focal point of the magnification means. The lens hood is fixed to an adjustable arm that is attached to a base. The adjustable arm allows the magnification means and LED's to be directed at virtually any angle onto a workpiece. The base allows the apparatus to be self-standing and is adapted to receive a portable power source for powering the LED's. The apparatus may incorporate a diffuser lens to provide a softer lighting effect.

13 Claims, 4 Drawing Sheets

ADJUSTABLE ILLUMINATION APPARATUS HAVING PRE-FOCUSED LED AND MAGNIFICATION LENS

BACKGROUND OF THE INVENTION

1. Field of the Invention

The present invention pertains generally to lighting equipment and more particularly to a portable combination magnifying lens and lamp.

2. Description of the Background Art

There arc numerous known varieties of lighting or illumination equipment available today. Such known illumination equipment typically uses incandescent or fluorescent bulbs as its lighting means. Incandescent bulbs has the advantage of a reasonable light output, but its drawbacks are the relatively high power consumption and heat generation. Flourescent bulbs do not require as much power or generate as much heat as incandescent bulbs, however, flourescent bulbs are significantly larger than comparable incandescent bulbs that generate similar lighting output. Nonetheless, these lighting schemes almost universally require 110V AC household electrical current to operate, and hence, require a power cord that effectively limits the range of the lamp's portability. Therefore, true portability mandates that the illuminating apparatus be cordless.

Cordless illumination devices are also commonly known and available, however, since such devices cannot always run on 110V household AC current, their lighting output is limited. These illumination devices typically operate on a voltage of approximately 3V to 12V battery power and a single component (usually incandescent bulb) illuminating source with an unequally dispersed and limited lighting output. Such cordless illumination devices are generally in the form of hand-held lighting devices that do not have self-standing capability and are typically designed to function as an inspection aid rather than a workpiece-viewing enlargement apparatus.

Illumination devices that incorporate magnification capability are also known. However, the lighting schemes used in such combination illumination devices also suffer from the aforementioned constraints of high power consumption, heat Generation, and the lack of true portability, whereby gaining an advantage in one aspect results in a drawback in others. The best known illumination device having magnification capability is the "magnifier lamp" that is attached to a piece of furniture or structure. Such lamps operate on 110V AC and therefore are not portable.

Accordingly, there exists a need for a self-standing, portable illumination apparatus that incorporates a magnification means coupled to the illumination source that produces a uniformly illuminated area on the workpiece, without a correspondingly high power requirement, whereby the magnification means and illumination source is directionally adjustable as an integral unit. The present invention satisfies this need, as well as others, and generally overcomes the deficiencies found in existing art.

BRIEF SUMMARY OF THE INVENTION

The present invention pertains to an illumination apparatus that has a magnification means in combination with LED's (Light Emitting Diodes). The LED's are arranged in an array on a mounting ring that is placed inside a lens hood that surrounds the magnification means. The LED's are mounted at an angle on the mounting to provide optimum lighting dispersion onto the focal point of the magnification means.

The lens hood is fixed to an adjustable arm that is attached to a base, The adjustable arm allows the magnification means and LED's to be directed at virtually any angle onto a workpiece. The base allows the apparatus to be self-standing and is adapted to receive a portable power source for powering the LED's.

An object of the invention is to provide a self-standing illumination apparatus having directional adjustability and magnification capability.

Another object of the invention is to provide an illumination apparatus wherein the illumination source is automatically directed onto a focal point of its magnification means.

Still another object of the invention is to provide an illumination apparatus that utilizes a relatively low power consumption.

Still another object of the invention is to provide an illumination apparatus that is portable.

Still another object of the invention is to provide an illumination apparatus that has a reduced heat output from its illumination source.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 4. It will be appreciated that the apparatus may vary as to configuration and as to details of the parts without departing from the basic concepts as disclosed herein.

Figure 1:
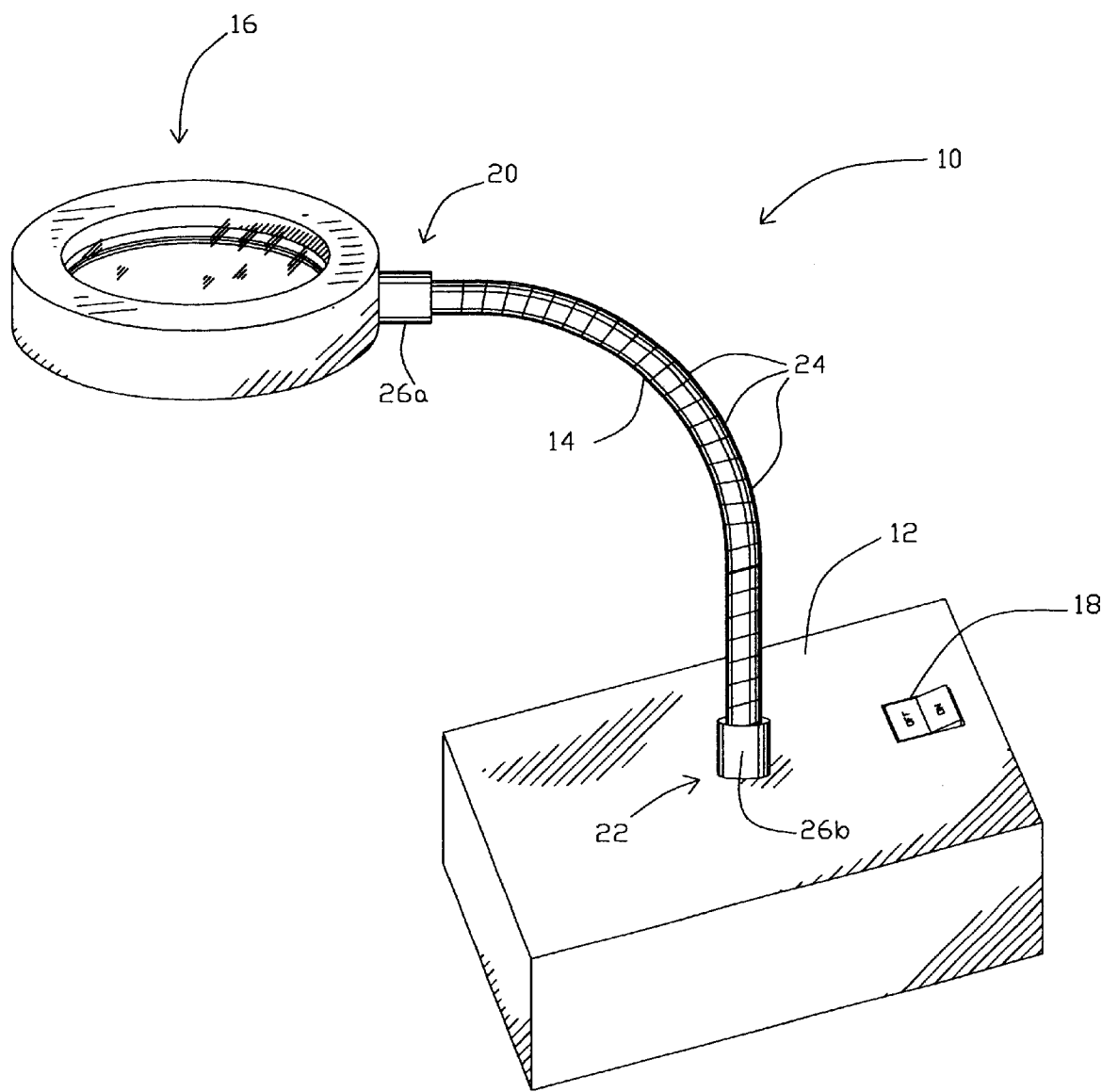
FIG. 1 is a perspective view of an illumination apparatus in accordance with the present invention.
Figure 2:
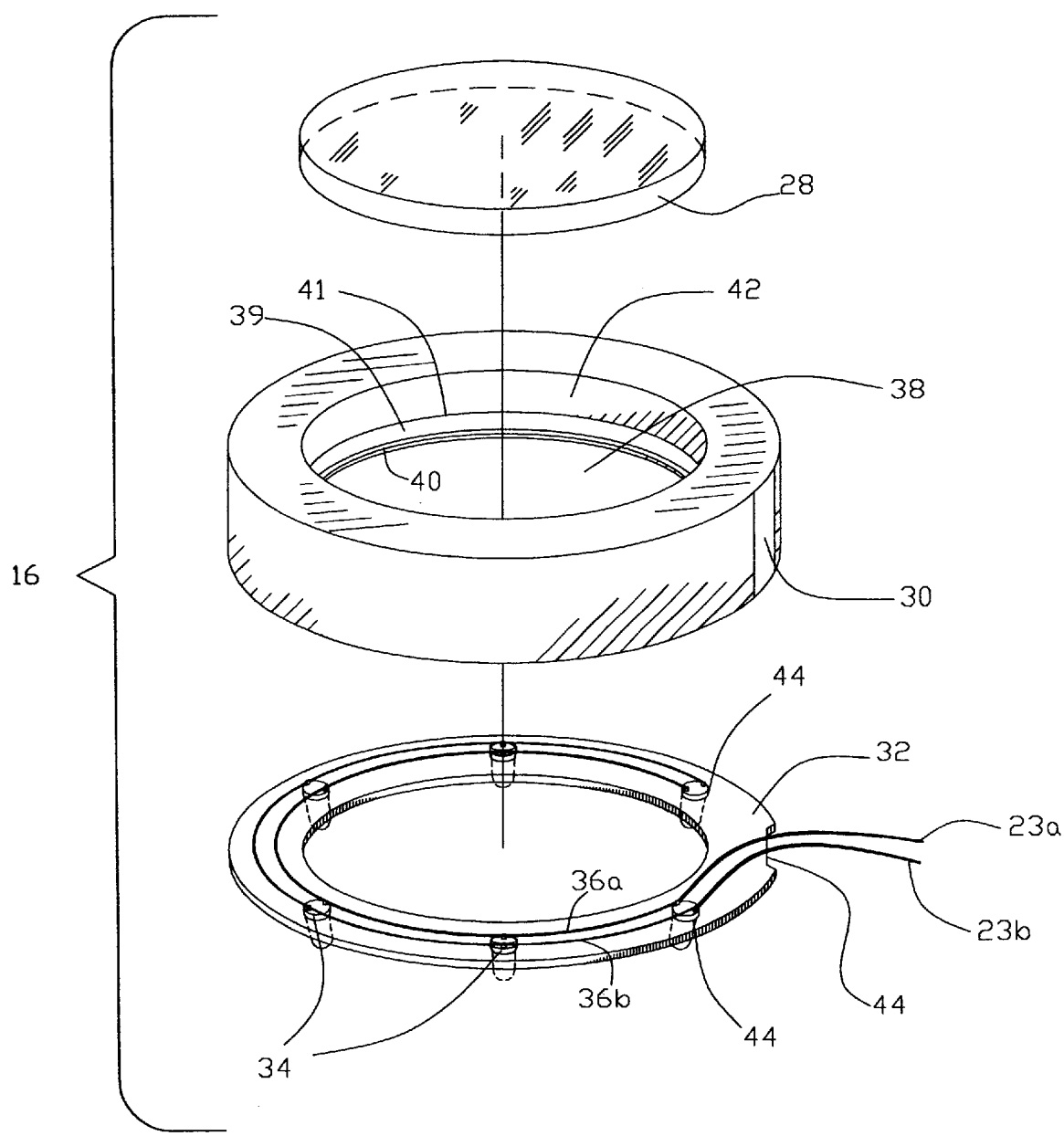
FIG. 2 is an exploded view of an illuminated optical assembly shown in FIG. 1.

Referring to FIG. 1 and FIG. 2, an illumination apparatus 10 in accordance with the present invention is generally shown. Illumination apparatus 10 comprises a base 12, an adjustable arm 14, and an illuminated optical assembly 16.

Base 12 includes an activation switch 18 and is adapted to house a portable power source (not shown), such as batteries or the like. Base 12 allows for the placement of apparatus 10 on a surface such that apparatus 10 may be self-standing, regardless of the position or orientation of adjustable arm 14 and illuminated optical assembly 16. Base 12 is preferably fabricated from plastic, or a like substance to offer a light weight and inexpensive, yet sturdy characteristics.

Adjustable arm 14 includes a first end 20 and a second end 22 and has a generally tubular construction such that insulated electrical wires 23a and 23b may pass therethrough between base 12 and illuminated optical assembly 16. In the preferred embodiment of the invention, adjustable arm 14 is preferably fabricated from a metallic material and has a plurality of interconnected segments 24 cooperating with each other such that there is a degree of movement available between segments 24. Hence, the cumulative effect of the plurality of interconnected segments 24 is that adjustable arm 14 may be bent to virtually any angle and at any point along the length of adjustable arm 14. Second end 22 of adjustable arm 14 is attached to base 12 by any known and practical means to ensure a rigid and durable connection therebetween, so that the repeated twisting and bending action imposed on adjustable arm 14 does not result in a separation thereof. First end 20 of adjustable arm 14 is attached to illuminated optical assembly 16 also preferably using any known and practical means to ensure for a rigid and durable connection therebetween. A pair of collars 26a and 26b disposed on first end 20 and second end 22, respectively, of adjustable arm 14 serve to attach adjustable arm 14 to base 12 and illuminated optical assembly 16. As an alternative embodiment (not shown), multiple rigid segments (not shown) interconnected by a combination of swivel, pivot and/or universal joints (not shown) may be used to suspend illuminated optical assembly 16 from base 12. Hence, the alternative embodiment also provides for directing illuminated optical assembly 16 at virtually any angle or position.

Figure 3:
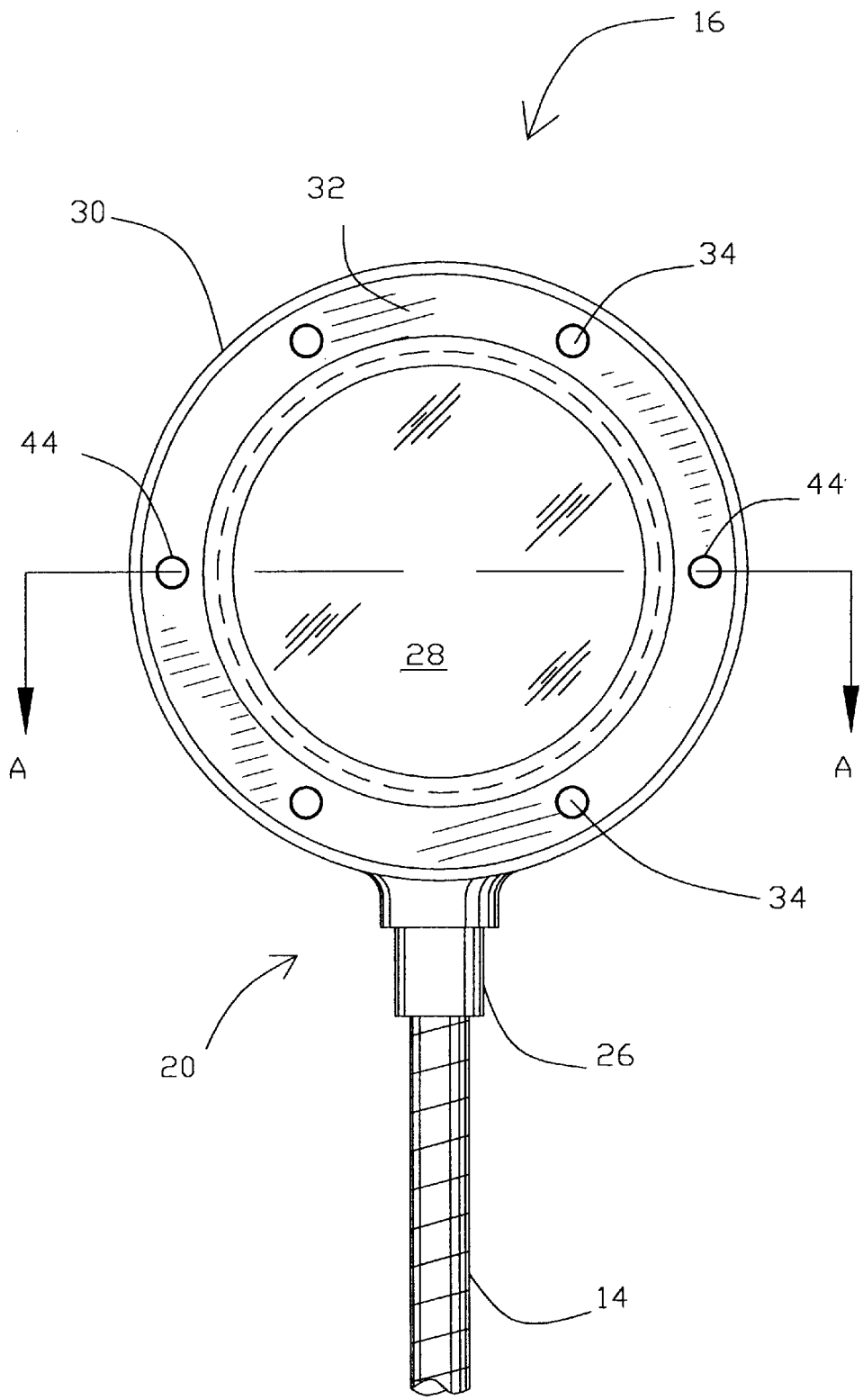
FIG. 3 is a bottom view of an illuminated optical assembly shown in FIG. 1.

Referring also to FIG. 3, illuminated optical assembly 16 is generally shown. Illuminated optical assembly 16 generally comprises a magnifying lens 28, and lens hood 30, a mounting ring 32, a plurality of LED's 34, electrical leads 23a and 23b, and uninsulated bus wire 36a and 36b.

Magnifying lens 28 is preferably circular and is press-fitted within a centrally defined opening 38 of lens hood 30. Magnifying lens 28 is maintained in position within centrally defined opening 38 of lens hood 30 by resting in a groove 39, defined between an annular flange 40 and a ridge 41, adjacent the bottom of centrally defined opening 38. Also, since the shape of centrally defined opening 38 matches that of magnifying lens 28, an inner lateral wall 42 provides a slight degree of compression against magnifying lens 28 that helps maintain magnifying lens 28 in place within centrally defined opening 38 of lens hood 30. Magnifying lens 28 is selected to provide high quality optical performance characteristics.

Mounting ring 32 includes a plurality of holes 44 configured to receive LED's 34, as well as a relief slot 46. Mounting ring 32 is preferably fabricated from a lightweight metallic material, such as aluminum, however, other materials that are light, relatively rigid, and heat tolerant may also be used. In the preferred embodiment, there are six holes 44 that are disposed in an evenly spaced array apart from each other and in a generally circular pattern. All LED's 34 are connected to uninsulated bus wire 36a and 36b by soldering or like means, thereby enabling them to receive electrical power from the portable power source within base 12. Those skilled in the art will appreciate that insulated wire may also be employed instead of uninsulated bus wire 36a and 36b. To provide a constant specified voltage to each of the six LED's 34, uninsulated bus wire 36a and 36b are connected in a parallel configuration to LED's 34. Uninsulated bus wire 36a and 36b is connected to electrical leads 23a and 23b that pass through adjustable arm 14 by detachable couplers (not shown). It is also contemplated that mounting ring 32 may not incorporate relief slot 46.

An advantage obtained from the use of LED's 34 is a lower power consumption requirement and reduced heat generation therefrom. Preferably, LED's 34 are of the type known by those skilled in the art as "white LED's" specifically designed to output visible white light with the application of proper operating voltages and without the aid of additional optical materials. The selection of LED's 34 is based on maximizing the amount of light output and minimizing the amount of generated heat. It is should be noted that the specific number of LED's 34, and hence its corresponding holes 44 in mounting ring 32 is not limited to six, since a greater or lesser number of LED's 34 may be utilized, depending on the specific needs and available power. Similarly, the specifications for LED's 34 may be varied as required by the specific application. Since LED's 34 are generally designed to have a 100,000 hour lifetime, it is highly unlikely that replacing an LED 34 would be necessary during the useful life of apparatus 10.

Figure 4:
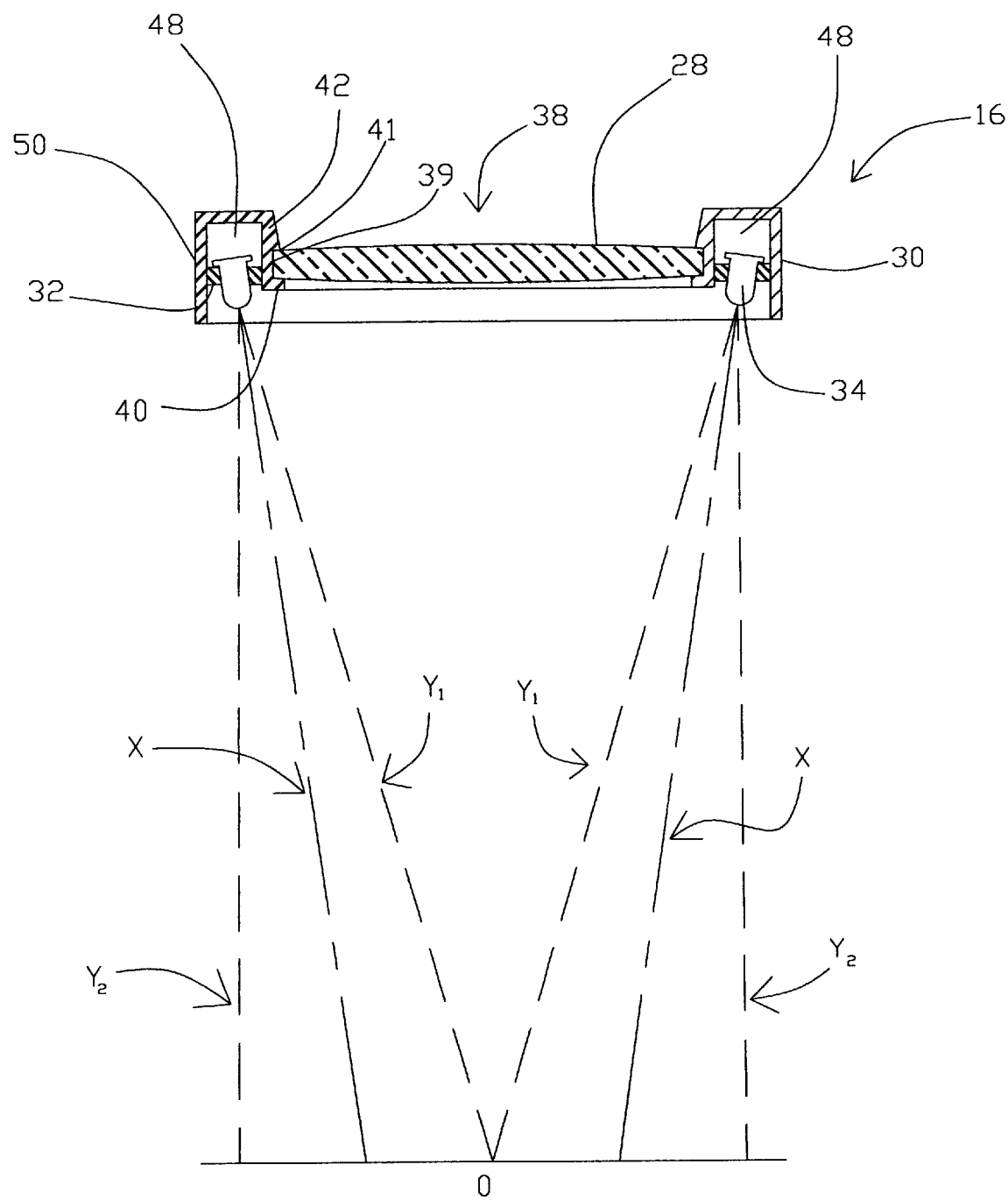
FIG. 4 is a cross-sectional view of the illuminated optical assembly shown in FIG. 3, taken along line A—A.

Referring also to FIG. 4, it can be seen that lens hood 30 incorporates an annular channel 48 that encircles lens hood 30. Annular channel 48 is bordered by inner lateral wall 42 and an outer lateral wall 50 that is configured to receive mounting ring 32 therebetween. When mounting ring 32 is inserted within annular channel 48, mounting ring 32 is interposed between inner lateral wall 42 and outer lateral wall 50 by any appropriate means to maintain mounting ring 32 in place therein. Such means may include, but is not limited to, screws (not shown), a groove (not shown), or compressive force between inner lateral wall 42 and outer lateral wall 50. Lens hood 30 is preferably made of plastic, however, other lightweight, heat-tolerant material may also be used.

Relief slot 46 provides access for easily removing mounting ring 32 from lens hood 30 when necessary. As such, not only is mounting ring 32 interchangeable, but also a variety of mounting rings having differing LED 34 combinations may be interchangeably used, thereby allowing illumination apparatus 10 to be adaptable to different lighting needs. Moreover, in the unlikely event of failure of an individual LED 34, the removability of mounting ring 32 allows for its replacement.

LED's 34 are positioned in an offset orientation within holes 44 of mounting ring 32. This offset positioning of LED's 34 allows for the convergence of light towards a focal point of magnifying lens 28, shown as point O. LED's 34 are press-fitted in position within holes 44, and high temperature glue may be applied to ensure a reliable mounting thereon. As shown in FIG. 4, the central axis of the light beam that radiates from LED's 34 is represented by X, the inner range of the light beam is represented by $Y_1$, and the outer range of the light beam is represented by $Y_2$. It can be appreciated that the space formed between $Y_1$ and $Y_2$ is generally conical. While it is contemplated that the central axis of the light beams, shown as X, converge toward each other, they preferably do not intersect at or before the focal point O of magnifying lens 28. The inner range of the light beam, which is represented by $Y_1$, however, preferably intersects adjacent the focal point 0 of magnifying lens 28. This orientation of LED's therefore maximizes the area of coverage of light while ensuring a lack of voids. It also ensures that a uniform distribution of light is reflected onto the surface.

Diffuser lens 35 is preferably annular and sized to fit within annular channel 48 of lens hood 30 and held in place by snaps (not shown), press fitting, or like means. Diffuser lens 35 provides an improvement in illuminating some reflective surfaces by providing a softer lighting effect, and hence, reducing the reflection radiating therefrom. Diffuser lens 35 may be either a clear or translucent material having a frosted, faceted or prismatic surface. Those skilled in the art will appreciate that apparatus 10 may operate either with or without diffuser lens 35, depending on the specific needs of the user.

Although the description above contains many specificities, these should not be construed as limiting the scope of the invention but as merely providing illustrations of some of the presently preferred embodiments of this invention. Thus, the scope of this invention should be determined by the appended claims and their legal equivalents.

What is claimed is:

1. A portable lighting apparatus, comprising:
   (a) a base;
   (b) an adjustable arm extending from said base; and
   (c) an illuminated optical assembly connected to said adjustable arm, said illuminated optical assembly comprising:
      (i) a magnifying lens having a defined focal point;
      (ii) a plurality of LED's disposed around said magnifying lens, said LED's angled to provide optimum lighting at a focal point of said magnifying lens, whereby a central axis of the light beam radiated from each said LED approach each other, but said central axis do not intersect at or before the focal point of said magnifying lens,
      (iii) a mounting, ring disposed around the periphery of said magnifying lens, said mounting ring including a lower surface and an upper surface, wherein said lower surface being directed generally toward the focal point of said magnifying lens,
   (d) a lens hood being provided, said lens hood having an annular channel and a centrally defined opening therein, wherein said annular channel being, adapted to receive said mounting ring and said opening being adapted to receive said magnifying lens.

2. A portable lighting apparatus, comprising:
   (a) a base;
   (b) an adjustable arm extending from said base; and
   (c) an illuminated optical assembly connected to said adjustable arm, said illuminated optical assembly comprising:
      (i) a magnifying lens having a defined focal point;
      (ii) a plurality of LED's disposed around said magnifying lens, said LED's being angled to provide optimum lighting at said focal point of said magnifying lens, said LED's being angled such that an inner range of the light beam radiated from each said LED intersects adjacent said focal point of said magnifying lens.

3. An apparatus as recited in claim 1, further comprising a diffuser lens, said diffuser lens disposed adjacent said LED's, whereby the light radiated is diffused by said diffuser lens prior to reaching the focal point of said magnifying lens.

4. An apparatus as recited in claim 2, wherein said LED's are mounted to said mounting ring in an evenly spaced array.

5. An apparatus as recited in claim 1, wherein said base contains a portable power source for powering said LED's.

6. An illuminated optical assembly for a portable lighting apparatus, comprising:
   (a) a lens hood, said lens hood having an annular configuration with a centrally defined opening therein;
   (b) a mounting ring disposed within said lens hood around the periphery of said opening;
   (c) a magnifying lens positioned within said opening of said lens hood, said magnifying lens having a defined focal point; and
   (d) a plurality of LED's mounted onto said mounting ring, said LED's angled to provide optimum lighting at the focal point of said magnifying lens, whereby a central axis of the light beam radiated from each said LED approach each other, but said central axes do not intersect at or before the focal point of said magnifying lens.

7. An apparatus as recited in claim 6, wherein said LED's are angled such that an inner range of the light beam radiated from each said LED intersects adjacent the focal point of said magnifying lens.

8. An apparatus as recited in claim 6, wherein said LED's are mounted onto said mounting ring in an evenly spaced array.

9. An apparatus as recited in claim 6, further comprising a diffuser lens, said diffuser lens disposed adjacent said LED's, whereby the light radiated is diffused by said diffuser lens prior to reaching the focal point of said magnifying lens.

10. An apparatus as recited in claim 6, further comprising:
    (a) an adjustable arm attached to said lens hood; and
    (b) a base attached to said adjustable arm, said base adapted for housing a portable power source in electrical communication with said LED's.

11. A portable lighting apparatus, comprising:
    (a) a base adapted for containing a portable power source;
    (b) an adjustable arm extending from said base,
    (c) a lens hood attached to said adjustable arm, said lens hood having an annular channel and a centrally defined opening therein;
    (d) a magnifying lens disposed within said opening of said lens hood, said magnifying lens having a defined focal point;
    (e) a mounting ring disposed within said annular channel of said lens hood, said mounting ring surrounding said magnifying lens; and
    (f) a plurality of LED's positioned on said mounting ring in an evenly spaced array, said LED's angled to provide optimum lighting at the focal point of said magnifying lens, whereby a central axis of the light beam radiated from each said LED approach each other, but said central axes do not intersect at or before the focal point of said magnifying lens.

12. An apparatus as recited in claim 11, wherein said LED's are angled such that an inner range of the light beam radiated from each said LED intersects adjacent the focal point of said magnifying lens.

13. An apparatus as recited in claim 11, further comprising a diffuser lens, said diffuser lens disposed adjacent said LED's, whereby the light radiated is diffused by said diffuser lens prior to reaching the focal point of said magnifying lens.

* * * * *